United States Patent
Peng et al.

(10) Patent No.: US 10,296,774 B2
(45) Date of Patent: May 21, 2019

(54) FINGERPRINT RECOGNITION APPARATUS

(71) Applicant: Huawei Technologies Co., Ltd., Shenzhen (CN)

(72) Inventors: Xu Peng, Shanghai (CN); Jianglin Gu, Shenzhen (CN); Bo Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/512,278

(22) PCT Filed: Sep. 18, 2014

(86) PCT No.: PCT/CN2014/086844
§ 371 (c)(1),
(2) Date: Mar. 17, 2017

(87) PCT Pub. No.: WO2016/041174
PCT Pub. Date: Mar. 24, 2016

(65) Prior Publication Data
US 2017/0277932 A1    Sep. 28, 2017

(51) Int. Cl.
*G06K 9/00* (2006.01)
*G06F 21/32* (2013.01)
*H04L 9/32* (2006.01)

(52) U.S. Cl.
CPC .......... *G06K 9/0002* (2013.01); *G06F 21/32* (2013.01); *G06K 9/00* (2013.01); *G06K 9/00006* (2013.01); *G06K 9/00087* (2013.01); *H04L 9/3231* (2013.01)

(58) Field of Classification Search
CPC .. G07C 9/00563; G06F 21/32; G06K 9/0002; G06K 9/00087; G06K 9/00006; H04L 9/3231
USPC .......................................................... 382/124
See application file for complete search history.

(56) References Cited

U.S. PATENT DOCUMENTS

| | | | |
|---|---|---|---|
| 6,067,368 A | 5/2000 | Setlak et al. | |
| 6,347,040 B1 * | 2/2002 | Fries | G06K 9/0002 341/20 |
| 2003/0063445 A1 | 4/2003 | Fischbach et al. | |
| 2006/0034499 A1 | 2/2006 | Shinoda et al. | |
| 2009/0257626 A1 | 10/2009 | Sherlock et al. | |

(Continued)

FOREIGN PATENT DOCUMENTS

| | | |
|---|---|---|
| CN | 1766904 A | 5/2006 |
| CN | 202948464 U | 5/2013 |

(Continued)

OTHER PUBLICATIONS

Ratha, N. et al., "Automatic Fingerprint Recognition Systems" In "Automatic Fingerprint Recognition Systems," XP055326746, Jan. 1, 2004, 24 pages.

*Primary Examiner* — Daniel G Mariam
(74) *Attorney, Agent, or Firm* — Slater Matsil, LLP

(57) ABSTRACT

Embodiments of the present invention provide a fingerprint recognition apparatus. The finger recognition apparatus includes a conductive housing. Additionally, the finger recognition apparatus includes a conductor frame, configured to transmit a radio frequency signal. The fingerprint recognition apparatus also includes an insulation layer, disposed between the conductor frame and the conductive housing.

17 Claims, 2 Drawing Sheets

(56) References Cited

U.S. PATENT DOCUMENTS

2010/0321159 A1* 12/2010 Stewart .................. G06F 21/32
340/5.83
2014/0380209 A1* 12/2014 Tsukamoto ........... G06F 3/0484
715/763
2016/0335468 A1   11/2016 Long et al.

FOREIGN PATENT DOCUMENTS

| CN | 103793691 A | 5/2014 |
| CN | 103942538 A | 7/2014 |
| KR | 20060003877 A | 1/2006 |
| WO | 2010019961 A2 | 2/2010 |

* cited by examiner

FINGERPRINT RECOGNITION APPARATUS

CROSS-REFERENCE TO RELATED APPLICATIONS

This application is a national stage of International Application No. PCT/CN2014/086844, filed on Sep. 18, 2014, which is hereby incorporated by reference in its entirety.

TECHNICAL FIELD

Embodiments of the present invention relate to the information technology field, and more specifically, to a fingerprint recognition apparatus.

BACKGROUND

Nowadays, a fingerprint function gradually becomes a new hotspot for a smartphone. An active fingerprint sensor has long-distance recognition and can penetrate a relatively thick coating, and practicality and reliability are relatively high. When the active fingerprint sensor works, a high-frequency voltage of a stimulus source reaches a finger through stainless steel, so that a radio frequency field is formed between the finger and the sensor. The sensor includes a sensor array. Because a fingerprint of a finger is concave and convex, and effects of a convex area and a concave area on the radio frequency field are different, signal strength sensed by the sensor array has a peak value in the convex area and a valley value in the concave area. After values of signal strength sensed by sensor elements in the sensor array are compared with a reference stimulus high-frequency signal, a signal is amplified by using an amplifier. A finger concave and convex image on the entire array is correspondingly obtained, that is, a fingerprint image.

In the prior art, there is a fingerprint recognition apparatus in which an active fingerprint sensor is used and a stainless steel frame is used, to generate a radio frequency signal.

SUMMARY

Embodiments of the present invention provide another fingerprint recognition apparatus.

According to a first aspect, embodiments of the present invention provide a fingerprint recognition apparatus, including a conductive housing and a conductor frame, configured to transmit a radio frequency signal. The fingerprint recognition apparatus also includes an insulation layer, disposed between the conductor frame and the conductive housing.

With reference to the first aspect, in a first implementation manner of the first aspect, a sensor of the fingerprint recognition apparatus is disposed between a fingerprint recognition plane and a circuit board, and the apparatus further includes a fastening layer, connected between the circuit board and the conductor frame.

With reference to the first implementation manner of the first aspect, in a second implementation manner of the first aspect, a conduction layer of the fingerprint recognition apparatus is connected between the circuit board and the conductor frame, and the fastening layer is located on an outer side of the conduction layer.

With reference to the second implementation manner of the first aspect, in a third implementation manner of the first aspect, the fastening layer is further configured to connect the circuit board and the conductor frame in a sealing manner.

With reference to the second or third implementation manner of the first aspect, in a fourth implementation manner of the first aspect, the conduction layer is a conductive silver paste.

With reference to the first aspect or any one of the first to fourth implementation manners of the first aspect, in a fifth implementation manner of the first aspect, the insulation layer is in contact with an outer surface of the sensor of the fingerprint recognition apparatus.

With reference to the first aspect or any one of the first to fifth implementation manners of the first aspect, in a sixth implementation manner of the first aspect, the conductor frame covers a part of the outer surface of the sensor.

With reference to the first aspect or any one of the first to sixth implementation manners of the first aspect, in a seventh implementation manner of the first aspect, the insulation layer and the conductor frame are modeled in an integrated manner.

With reference to the first aspect or any one of the first to seventh implementation manners of the first aspect, in an eighth implementation manner of the first aspect, the apparatus is a terminal.

With reference to the eighth implementation manner of the first aspect, in a ninth implementation manner of the first aspect, the conductive housing is a rear housing of the terminal.

According to a second aspect, a fingerprint recognition apparatus is provided, including a conductor frame, configured to transmit a radio frequency signal and a sensor. The fingerprint recognition apparatus also includes a circuit board, disposed at a lower layer of the sensor and a fastening layer, connected between the circuit board and the conductor frame.

With reference to the second aspect, in a first implementation manner of the second aspect, a conduction layer of the fingerprint recognition apparatus is connected between the circuit board and the conductor frame, and the fastening layer is located on an outer side of the conduction layer.

With reference to the first implementation manner of the second aspect, in a second implementation manner of the second aspect, the fastening layer is further configured to connect the circuit board and the conductor frame in a sealing manner.

With reference to the first or second implementation manner of the second aspect, in a third implementation manner of the second aspect, the conduction layer is a conductive silver paste.

With reference to the second aspect or any one of the first to third implementation manners of the second aspect, in a fourth implementation manner of the second aspect, an insulation housing of the fingerprint recognition apparatus is in contact with an outer surface of the sensor of the fingerprint recognition apparatus.

With reference to the second aspect or any one of the first to fourth implementation manners of the second aspect, in a fifth implementation manner of the second aspect, the conductor frame covers a part of the outer surface of the sensor.

With reference to the second aspect, or any one of the first to fifth implementation manners of the second aspect, in a sixth implementation manner of the second aspect, the apparatus is a terminal.

The embodiments of the present invention provide an insulation layer disposed between a conductor frame and a conductive housing, so that the conductor frame is insulated from the conductive housing. Because a radio frequency signal transmitted by the conductor frame is not affected when the conductive housing is grounded, the present invention can be effectively applied to a conductive housing.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
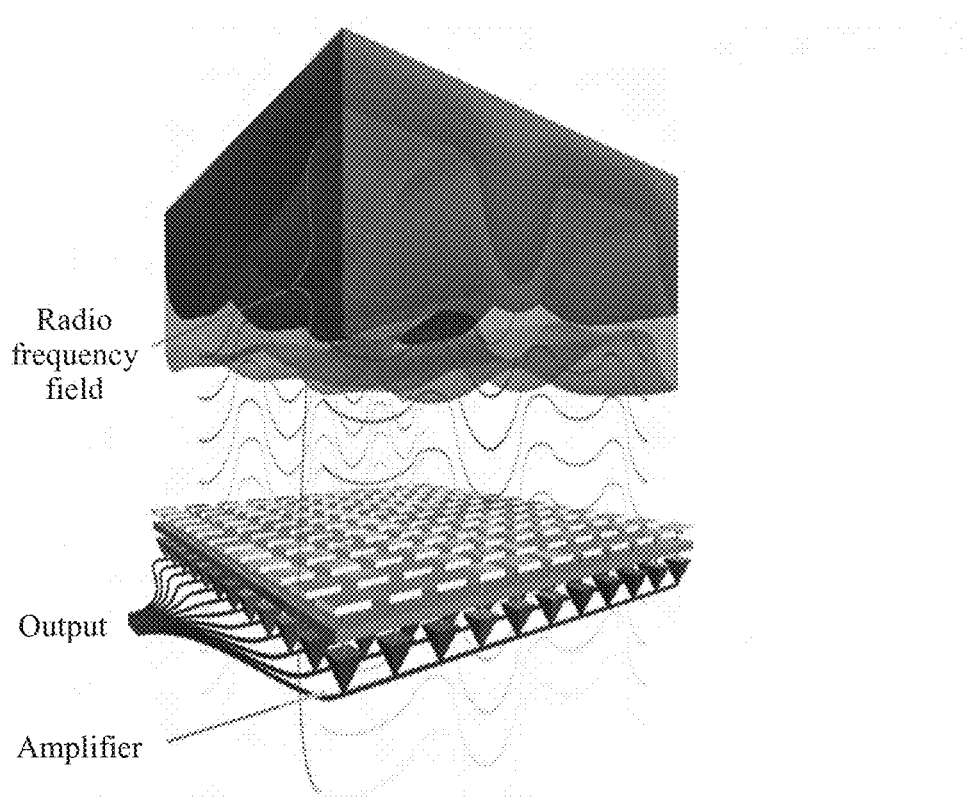
FIG. 1 is a schematic diagram of a working principle of a sensor according to an embodiment of the present invention.

FIG. 1 is a schematic diagram of a working principle of a sensor according to an embodiment of the present invention. As shown in the figure, a high-frequency voltage of a stimulus source reaches a finger through stainless steel, so that a radio frequency field is formed between the finger and the sensor. The sensor includes a sensor array. Because a fingerprint of a finger is concave and convex, and effects of a convex area and a concave area on the radio frequency field are different, signal strength sensed by the sensor array has a peak value in the convex area and a valley value in the concave area. After values of signal strength sensed by sensor elements in the sensor array are compared with a reference stimulus high-frequency signal, a signal is amplified by using an amplifier. A finger concave and convex image on the entire array is correspondingly obtained, that is, a fingerprint image. It should be understood that this embodiment is merely a specific implementation manner of the sensor, and embodiments of the present invention are not limited thereto.

Figure 2:
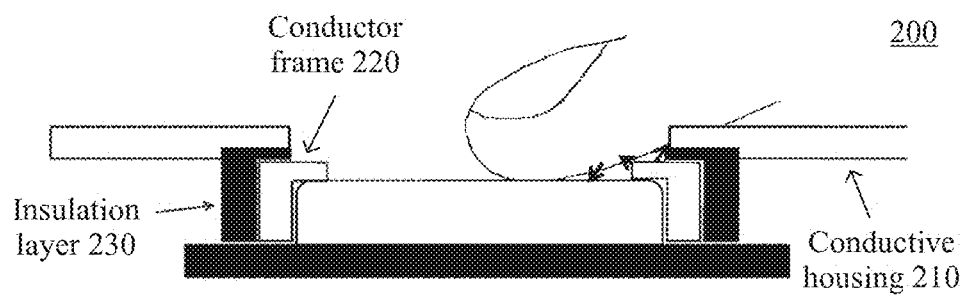
FIG. 2 is a schematic structural diagram of a fingerprint recognition apparatus according to another embodiment of the present invention.
Figure 3:
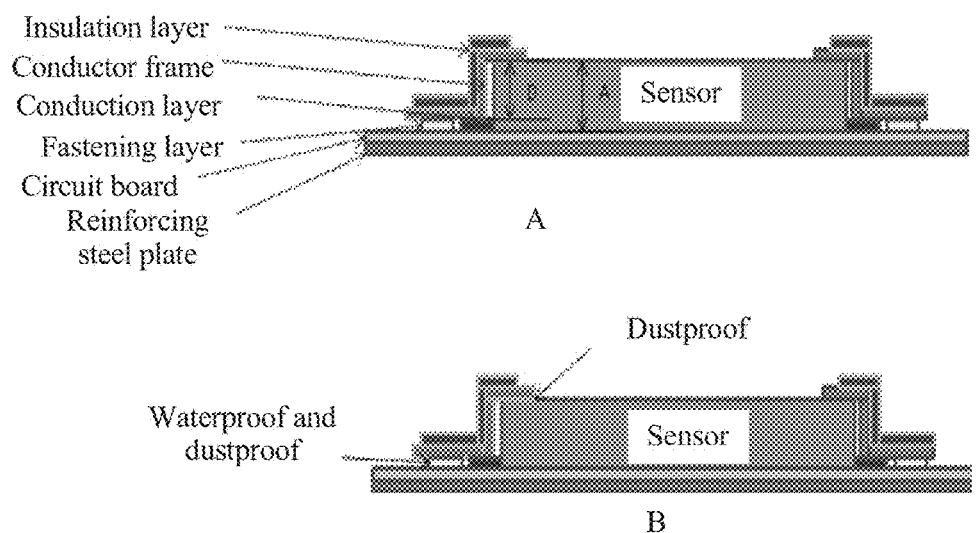
FIG. 3 is a schematic structural diagram of a side view of a fingerprint recognition apparatus according to another embodiment of the present invention.

FIG. 2 is a schematic structural diagram of a fingerprint recognition apparatus according to another embodiment of the present invention. To make the technical solutions in the present invention more comprehensible, description is made with reference to FIG. 3. It should be understood that an apparatus shown in FIG. 3 is merely an exemplary embodiment of the present invention. Corresponding components or elements in FIG. 3 are relatively independent. In other words, other embodiments of the present invention may be obtained by combining all or some of these components or elements without creative efforts. An apparatus 200 in FIG. 2 includes: a conductive housing 210; conductor frame 220, configured to transmit a radio frequency signal; and an insulation layer 230, disposed between the conductor frame 220 and the conductive housing 210.

It should be understood that the conductive housing may be a housing made of any conductor, for example, metal. In a preferred embodiment, a housing made of aluminum alloy may be used, and the conductive housing may be a front housing or a rear housing of a terminal, or may be a housing surrounding a fingerprint recognition area during fingerprint recognition, for example, a metal part of an outer surface. The conductor frame is configured to transmit a radio frequency signal, and may be a frame made of any conductor, for example, a metal frame. In a preferred embodiment, a frame made of stainless steel may be used. The insulation layer may be formed by any substance that implements an insulation function, for example, an insulation colloid or nonmetal.

In other words, a fingerprint recognition process is as follows: The conductor frame of the fingerprint recognition apparatus 200 transmits the radio frequency signal, and a sensor identifies the signal, so as to perform fingerprint recognition.

This embodiment of the present invention provides an insulation layer disposed between a conductor frame and a conductive housing, so that the conductor frame and the conductive housing are in an insulated state. Because a radio frequency signal transmitted by the conductor frame is not affected when the conductive housing is grounded, the present invention can be effectively applied to a conductive housing.

According to this embodiment of the present invention, the sensor of the fingerprint recognition apparatus is disposed between a fingerprint recognition plane and a circuit board. The apparatus in FIG. 2 further includes a fastening layer, connected between the circuit board and the conductor frame.

It should be understood that the fastening layer may be made of any substance that implements a fastening function, for example, a thermoset adhesive. The fastening layer may be sealed or unsealed. The circuit board belongs to a sensor module, and includes but is not limited to a printed circuit board, for example, a flexible printed circuit board.

According to this embodiment of the present invention, a conduction layer of the fingerprint recognition apparatus is connected between the circuit board and the conductor frame, and the fastening layer is located on an outer side of the conduction layer.

It should be understood that the conduction layer may be made of any substance that implements a conduction function, for example, metal, a conductive medium, or a conductive colloid (for example, a conductive silver paste). In addition, a secondary gel dispensing process may be used to bond the fastening layer and the conduction layer with the conductor frame and the circuit board. For example, a colloid of the conduction layer implements a circuit conduction function, and a colloid of the fastening layer implements a structure fastening function.

The colloid of the conduction layer is located on an inner side of the colloid of the fastening layer, that is, closer to a chip; thereby avoiding a case in which the colloid of the conduction layer is directly exposed, corroded, and oxidized. The conduction layer also implements a fastening function to some extent, but mainly implements a circuit conduction function, and the colloid of the fastening layer mainly bears structure impact force. In addition, the fastening layer and the conduction layer have a thickness. Therefore, in a preferred embodiment, a height size D of the conductor frame is less than a thickness size A of the sensor, as shown in figure A in FIG. 3.

According to this embodiment of the present invention, the fastening layer is further configured to connect the circuit board and the conductor frame in a sealing manner.

Because the fastening layer is sealed, a waterproof or dustproof function may be implemented, referring to figure B in FIG. 3.

According to this embodiment of the present invention, the conduction layer is a conductive silver paste.

According to this embodiment of the present invention, the insulation layer is in contact with an outer surface of the sensor of the fingerprint recognition apparatus.

Specifically, the conductor frame enables a frame to be in contact with the outer surface of the sensor, which may prevent dust from entering the apparatus, referring to figure B in FIG. 3.

According to this embodiment of the present invention, the conductor frame covers a part of the outer surface of the sensor.

It should be understood that, that the conductor frame covers a part of the outer surface of the sensor may be that the conductor frame and a covered outer surface may be in contact, or not in contact. It should further be understood that the conductor frame may further cover the insulation layer, so that an appearance is more beautiful.

It should be understood that, that the insulation layer covers a part of the outer surface of the sensor may be that the insulation layer partially wraps the outer surface of the sensor, so that an area, which is in contact with a fingerprint, of the sensor is less than a size of a sensor chip. In other words, in a design manner of sinking the sensor, an exposed part of the sensor module becomes small. A technical effect generated by such design is that a proportion of a fingerprint recognition area in a metal rear housing is appropriate. Because a fingerprint recognition area in contact with a fingerprint is relatively small, an actual requirement is better satisfied, thereby improving user experience, and indirectly improving security, for example, a better shockproof performance.

According to this embodiment of the present invention, the insulation layer and the conductor frame are modeled in an integrated manner.

It should be understood that because the insulation layer and the conductor frame are modeled in an integrated manner, on one hand, a waterproof and dustproof function may be implemented, and on the other hand, thickness sizes of the insulation layer and the conductor frame may be reduced, so that the fingerprint recognition apparatus is more precise, and occupies smaller space.

Figure 4:
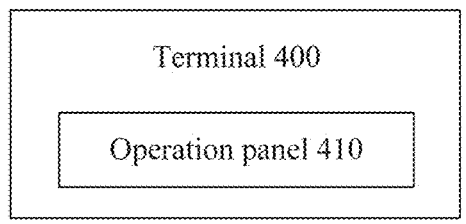
FIG. 4 is a schematic structural diagram of a terminal according to another embodiment of the present invention.

FIG. 4 is a schematic structural diagram of a terminal according to another embodiment of the present invention. A terminal 400 in FIG. 4 corresponds to the fingerprint recognition apparatus described in FIG. 2.

The terminal in FIG. 4 may be a smartphone, or any device having a metal housing, and the terminal in FIG. 4 includes an operation panel 410. It should be understood that the terminal may further include another component, for example, a processor chip and a memory chip. In this terminal, a component used for fingerprint recognition and another component may be used together, for example, are integrated into a chip, or may be separated, where the component used for fingerprint recognition is relatively independently used on the terminal.

According to the terminal in this embodiment of the present invention, an insulation layer disposed between a conductor frame and a conductive housing is provided, so that the conductor frame and the conductive housing are in an insulated state. Because a radio frequency signal transmitted by the conductor frame is not affected when the conductive housing is grounded, the present invention can be effectively applied to a terminal having a conductive housing.

According to this embodiment of the present invention, the conductive housing is a rear housing of the terminal.

Specifically, a fingerprint recognition plane is located on a rear surface of the terminal, for example, a metal rear housing of a mobile phone. Many terminal housings are metal. Because the fingerprint recognition apparatus is disposed on a metal rear housing of the terminal, on one hand, a fingerprint recognition function of the terminal is added, and on the other hand, the operation panel in front of the terminal is not affected. Neither beauty nor a user operation habit is affected, and user experience is greatly improved.

Figure 5:
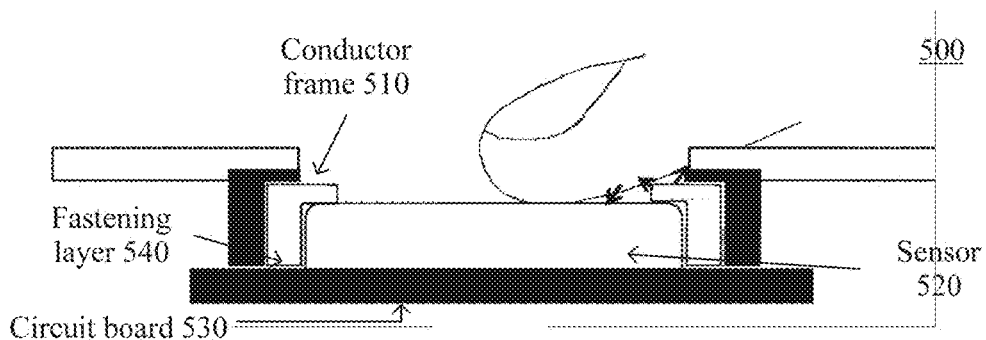
FIG. 5 is a schematic structural diagram of a fingerprint recognition apparatus according to another embodiment of the present invention.

In addition, a process of producing a structure a fingerprint recognition apparatus in the prior art is complex. The present invention provides a fingerprint recognition apparatus, which can effectively reduce process complexity on the premise that structure strength is ensured. FIG. 5 is a schematic structural diagram of a fingerprint recognition apparatus according to another embodiment of the present invention. An apparatus 500 in FIG. 5 includes: a conductor frame 510, configured to transmit a radio frequency signal; a sensor 520; a circuit board 530, disposed at a lower layer of the sensor; and a fastening layer 540, connected between the circuit board and the conductor frame.

In this embodiment of the present invention, because the fastening layer between the circuit board and the conductor frame is used, structure strength of the fingerprint recognition apparatus is effectively ensured.

According to this embodiment of the present invention, a conduction layer of the fingerprint recognition apparatus is connected between the circuit board and the conductor frame, and the fastening layer is located on an outer side of the conduction layer.

According to this embodiment of the present invention, the fastening layer is further configured to connect the circuit board and the conductor frame in a sealing manner.

Because the fastening layer is sealed, a waterproof or dustproof function may be implemented, referring to figure B in FIG. 3.

According to this embodiment of the present invention, the conduction layer is a conductive silver paste.

According to this embodiment of the present invention, an insulation housing of the fingerprint recognition apparatus is in contact with an outer surface of the sensor of the fingerprint recognition apparatus.

According to this embodiment of the present invention, the conductor frame covers a part of the outer surface of the sensor.

According to this embodiment of the present invention, the apparatus is a terminal.

For functions and description of corresponding components of the apparatus in FIG. 5, refer to the apparatus in FIG. 2, and details are not described herein.

In addition, the foregoing is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A fingerprint recognition apparatus, comprising:
a sensor having a first surface and further having a second surface opposite the first surface and disposed on a circuit board, wherein the first surface and the second surface are separated by a first edge and a second edge opposite the first edge;
a conductor frame formed from a conductive material and having a first frame portion disposed over, and sealed against, the circuit board, wherein a second frame portion of the conductor frame extends vertically from below the first surface of the sensor to above the first surface of the sensor, wherein a third frame portion of the conductor frame extends laterally from outside the first edge of the sensor over the first edge and directly over a first surface portion of the first surface, and wherein the third frame portion is sealed against the first surface portion; and
a conductive housing spaced apart from, and separate from, the conductor frame, wherein the conductive housing has a first housing portion extending from outside the conductor frame, over the conductor frame, wherein an innermost face of the first housing portion is aligned directly over the first surface portion, and directly over the third frame portion, and wherein a bottommost surface of the first housing portion is disposed above a topmost surface of the third frame portion; and
an insulation layer disposed between the conductor frame and the conductive housing and electrically insulating the conductor frame from the conductive housing, wherein the insulation layer extends vertically, outside of the second frame portion, from below the first surface of the sensor to above the topmost surface of the third frame portion, and extends laterally over at least a part of the third frame with a portion of the insulation layer being disposed directly over the third frame portion;
wherein the sensor is configured to sense a radio signal transmitted from the conductor frame and reflected from a user fingerprint.

2. The fingerprint recognition apparatus according to claim 1, further comprising:
a fastening layer connected between the circuit board and the conductor frame;
wherein the a sensor disposed between a fingerprint recognition plane and a circuit board.

3. The fingerprint recognition apparatus according to claim 2, wherein a conduction layer of the fingerprint recognition apparatus is connected between the circuit board and the conductor frame, and the fastening layer is located on an outer side of the conduction layer.

4. The fingerprint recognition apparatus according to claim 3, wherein the fastening layer is further configured to connect the circuit board and the conductor frame in a sealing manner.

5. The fingerprint recognition apparatus according to claim 3, wherein the conduction layer is a conductive silver paste.

6. The fingerprint recognition apparatus according to claim 2, wherein the insulation layer is in contact with an outer surface of the sensor.

7. The fingerprint recognition apparatus according to claim 2, wherein the conductor frame covers a part of an outer surface of the sensor.

8. The fingerprint recognition apparatus according to claim 1, wherein the insulation layer and the conductor frame are modeled in an integrated manner.

9. The fingerprint recognition apparatus according to claim 1 wherein the fingerprint recognition apparatus is a terminal.

10. The fingerprint recognition apparatus according to claim 9, wherein the conductive housing is a rear housing of the terminal.

11. A fingerprint recognition apparatus, comprising:
a sensor having a first surface and further having a second surface opposite the first surface, wherein the first surface and the second surface are separated by a first edge and a second edge opposite the first edge;
a circuit board disposed at a lower layer of the sensor with the second surface disposed on the circuit board;
a conductor frame formed from a conductive material and having a first frame portion disposed over the circuit board, wherein a second frame portion of the conductor frame extends vertically from below the first surface of the sensor to above the first surface of the sensor, and wherein a third frame portion of the conductor frame extends laterally from outside the first edge of the sensor over the first edge and directly over a first surface portion of the first surface, wherein the third frame portion is sealed against the first surface portion;
a fastening layer connected between the circuit board and the conductor frame and sealing the conductor frame to the circuit board; and
a conductive housing spaced apart from, separate from, and electrically insulated from, the conductor frame, wherein the conductive housing has a first housing portion extending from outside the conductor frame, over the conductor frame, wherein an innermost face of the first housing portion is aligned directly over the first surface portion, and directly over the third frame portion, and wherein a bottommost surface of the first housing portion is disposed above a topmost surface of the third frame portion;
wherein the sensor is configured to sense a radio signal transmitted from the conductor frame and reflected from a user fingerprint.

12. The fingerprint recognition apparatus according to claim 11, further comprising a conduction layer connected between the circuit board and the conductor frame, wherein the fastening layer is located on an outer side of the conduction layer.

13. The fingerprint recognition apparatus according to claim 12, wherein the conduction layer is a conductive silver paste.

14. The fingerprint recognition apparatus according to claim 11, further comprising an insulation housing in contact with an outer surface of the sensor.

15. The fingerprint recognition apparatus according to claim 11, wherein the conductor frame covers a part of an outer surface of the sensor.

16. The fingerprint recognition apparatus according to claim 11, wherein the fingerprint recognition apparatus is a terminal.

17. A method comprising:
receiving, by a sensor of a fingerprint recognition apparatus having a conductor frame and a circuit board, a radio frequency signal transmitted from the conductor frame and reflected from a user fingerprint, wherein the sensor has a first surface and further has a second surface opposite the first surface and disposed on the circuit board, and wherein the first surface and the second surface are separated by a first edge and a second edge opposite the first edge;
wherein the conductor frame is formed from a conductive material and has a first frame portion disposed over, and sealed against, the circuit board, wherein a second frame portion of the conductor frame extends vertically from below the first surface of the sensor to above the first surface of the sensor, wherein a third frame portion of the conductor frame extends laterally from outside the first edge of the sensor over the first edge and directly over a first surface portion of the first surface, and wherein the third frame portion is sealed against the first surface portion;
wherein the fingerprint recognition apparatus further has a conductive housing spaced apart from, and separate from, the conductor frame, wherein the conductive housing has a first housing portion extending from outside the conductor frame, over the conductor frame, wherein an innermost face of the first housing portion is aligned directly over the first surface portion, and directly over the third frame portion, and wherein a bottommost surface of the first housing portion is disposed above a topmost surface of the third frame portion;
wherein the fingerprint recognition apparatus further has an insulation layer is disposed between the conductor frame and the conductive housing, and electrically insulating the conductor frame from the conductive housing, wherein the insulation layer extends vertically, outside of the second frame portion, from below the first surface of the sensor to above the topmost surface of the third frame portion, and extends laterally over at least a part of the third frame with a portion of the insulation layer being disposed directly over the third frame portion; and
an insulation layer disposed between the conductor frame and the conductive housing, wherein the insulation layer extends vertically, outside of the second frame portion, from below the first surface of the sensor to above the topmost surface of the third frame portion, and extend laterally over at least a part of the third frame with a portion of the insulation layer being disposed directly over the third frame portion.

\* \* \* \* \*